June 21, 1949.  G. REID  2,473,545
VARIABLE SPEED POWER TRANSMISSION
Filed May 7, 1945  4 Sheets-Sheet 2

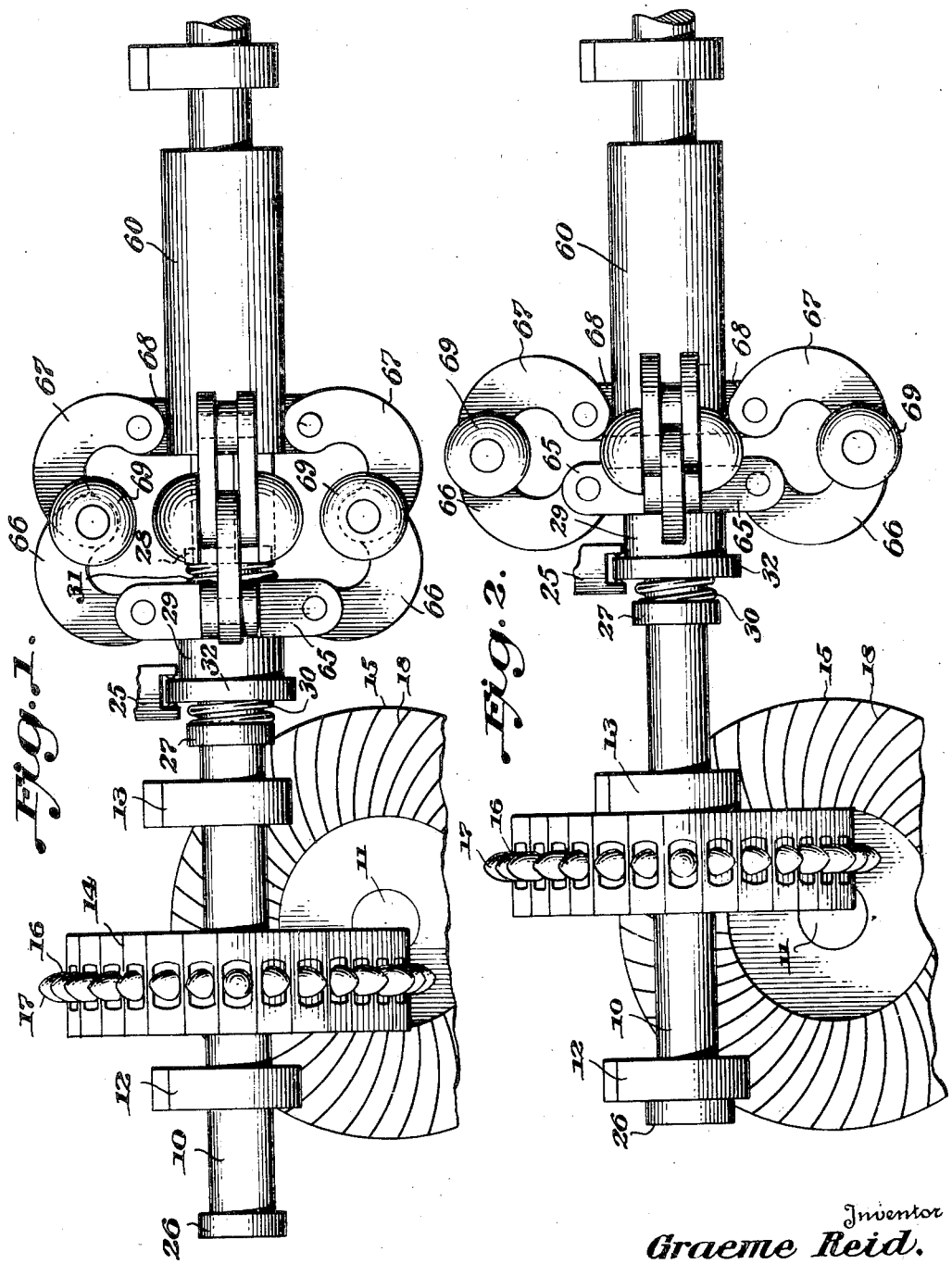

Inventor:
Graeme Reid,
By Mason & Hatfield
Attorney

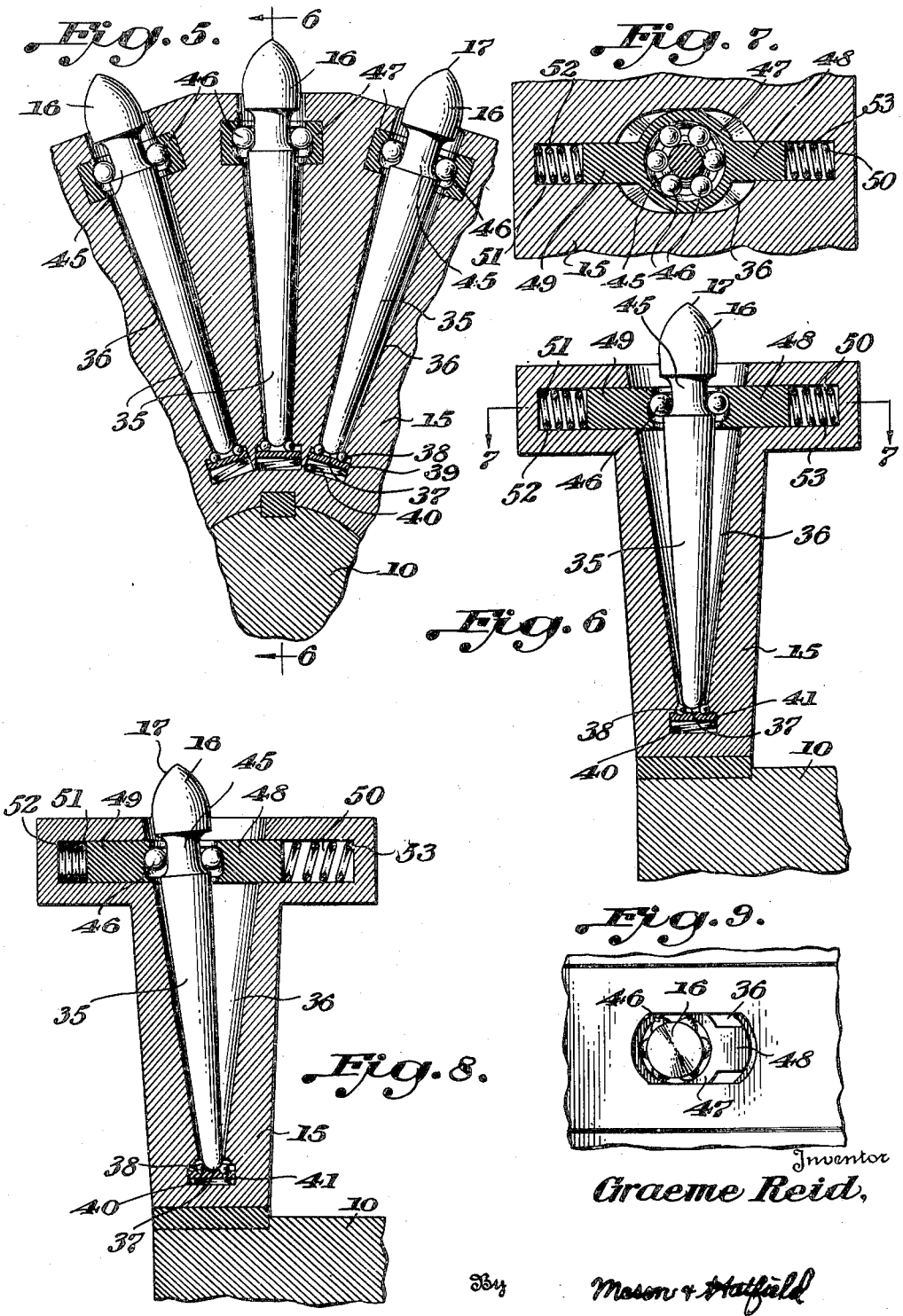

Inventor
Graeme Reid,
By Mason & Hatfield
Attor

Patented June 21, 1949

2,473,545

UNITED STATES PATENT OFFICE 2,473,545

VARIABLE-SPEED POWER TRANSMISSION

Graeme Reid, Essex Fells, N. J.

Application May 7, 1945, Serial No. 592,383

18 Claims. (Cl. 74—351)

The present invention relates to power transmissions of the variable ratio type.

It is a principal object of my invention to provide a reversible power transmission in which the transmission ratio between the driving element and the driven element may be continuously varied from neutral and an infinitely high ratio to a desired lower ratio such as a direct drive or any predetermined higher or lower ratio.

It is an important object of my invention to provide a variable speed power transmission, in which the transmission ratio may be continuously and positively varied from a higher to a lower ratio and vice versa, and in which the transmission elements are driven by a positive mechanical connection and with a minimum of power losses due to friction, slippage, etc.

Heretofore, it has been possible to obtain a continuously variable speed ratio in a power transmission by the use of the well known friction disc drives or the like but these types of transmissions have not been suitable for applications involving the transmission of substantial torque and power because of their high friction losses, slippage and consequent rapid wearing rate. Therefore such types of continuously variable ratio power transmissions have not been used in applications involving the transmission of substantial amounts of power such as are required in automotive transmissions. It is obvious that the most desirable form of power transmission for automotive use should be a type which is continuously variable from an infinitely high ratio to a desired lower ratio such as direct drive or overdrive and which should be capable of transmitting the power with a minimum of losses due to friction, slippage, etc., in order that the motor may be operated at its most efficient speed for the power demanded at the wheels.

It is therefore an important object of my invention to provide a power transmission of the continuously variable ratio type which is capable of the transmission of large amounts of power with a minimum of friction and slippage losses and which will be suitable for application to automotive drives and other heavy duty uses as well as all types of low power applications.

It is also an object of my invention to provide a continuously variable ratio power transmission in which the speed and hence the power ratio between the driving element and the driven element may be automatically varied in accordance with the power demands on the driven element in order that any given applied torque to the driving element may be converted into a constant torque at any varying speed on the driven element.

It is a further object of my invention to provide a continuously variable ratio power transmission in which the speed ratio between the driving and driven elements is automatically varied to meet changing power demands upon the driven element and in which additional manual means are provided for selectively converting any given applied torque on the driving element to a constant torque at a desired speed of the driven element in either a forward or reverse direction.

The power transmission of my invention is characterized by a minimum of moving parts and a simplicity of design resulting in increased efficiency due to the reduction of friction losses. The continuously variable speed ratio is obtained by a positive mechanical connection or drive and the automatic means for varying the speed ratio in accordance with the power demands upon the driven element enables the transmission to be used in combination with smaller and lighter power units since they may be operated at their speed of maximum efficiency for the torque required and regardless of the speed demands at the point of power application.

It is a still further object of my invention to provide a continuously variable ratio and positively driven power transmission in which the changes in ratio are smoothly and effortlessly made so that the driven element will be constantly rotated at an evenly changing speed and without jarring or shocking motions during the ratio changing periods and which, under given conditions where the driven element is required to be rotated at a given speed to produce a given torque, it will be rotated indefinitely at the given speed by such intermediate gear ratio to produce the given torque.

It is another object of my invention to provide a power transmission of the continuously variable ratio type in which the speed ratio between the driving and driven elements is automatically varied to meet changing power and speed demands and in which the normally driven element may smoothly become the driving element at the highest gear ratio when the torque applied to the normally driving element becomes less than the reactive torque of the driven element.

Still another object of my invention is to provide a manual control for the normally driving element to maintain the same in a low gear ratio with the normally driven element when the torque applied to the normally driven element is greater than that applied to the normally driving element to effect a braking action on the normally driven element.

Further objects and advantages of my invention will be apparent by reference to the following specification and drawings in which:

Figure 1 is a view of the automatic transmission with the driving wheel shown in the neutral position so that no power or rotation may be transmitted to the driven wheel;

Figure 2 is a view of the automatic transmission with the driving wheel shown in the position for direct or lowest ratio of drive to the driven wheel, the driving wheel having been moved from the neutral position and through the infinitely high ratio and intermediate ratio positions to the lowest predetermined ratio position;

Figure 5 is a fragmentary sectional view of the driving wheel showing in detail the configuration of the driving studs and a means for rotatably journaling the studs in the driving wheel;

Figure 6 is a sectional view taken on the line 6—6 of Figure 5 and showing the resilient means for permitting a limited movement of the driving stud in the direction of the axis of the driving wheel;

Figure 7 is a sectional view taken on the line 7—7 of Figure 6;

Figure 8 is a sectional view similar to Figure 6 but showing the driving stud moved to the left in the direction of the axis of the driving wheel;

Figure 9 is a fragmentary view of the periphery of the driving wheel with the driving stud in the position of Figure 8;

Figure 3:
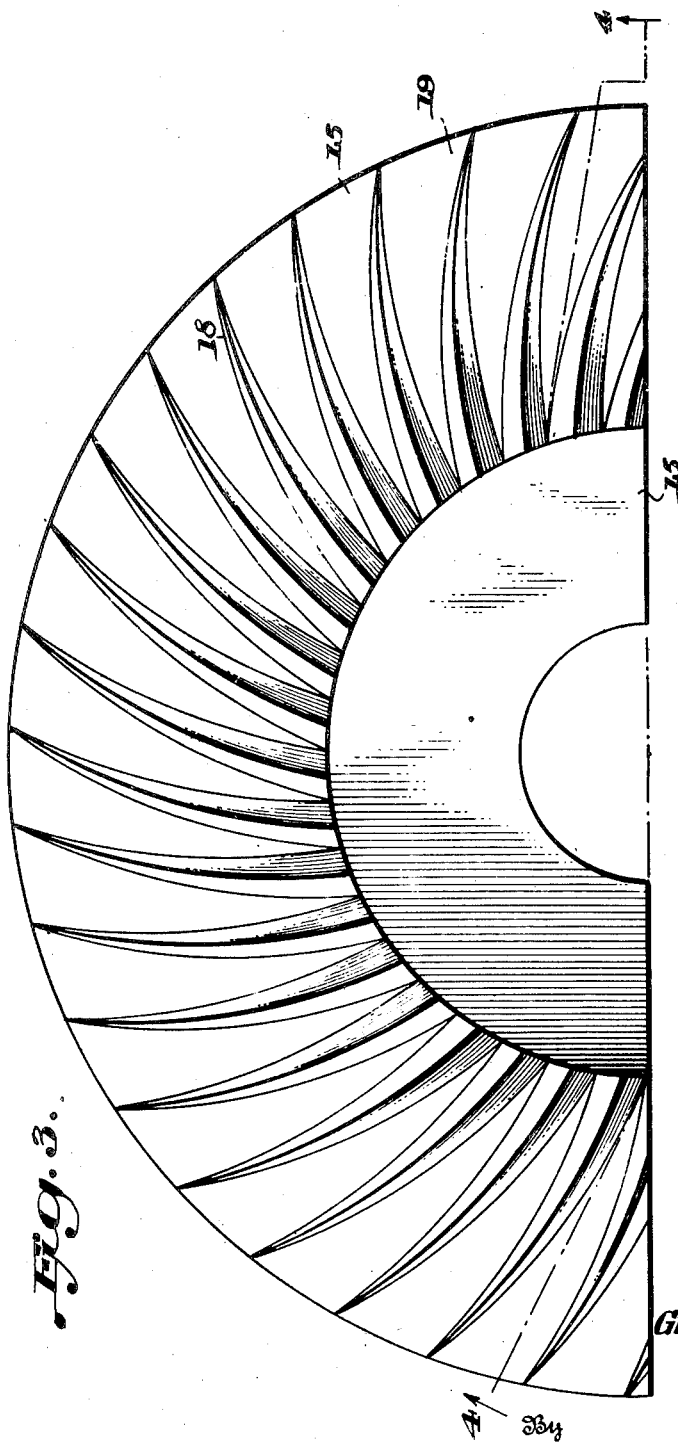
Figure 3 is a plan view of one half of the driven wheel showing the configuration of the cam grooves formed by the ridges on its base.

Referring to Figures 1 and 2 of the drawings, the power transmission includes the driving shaft 10 and the driven shaft 11. The driving shaft 10 is rotatably and slidably journaled in the bearings 12 and 13 while the driving shaft is rotatably journaled in any suitable bearings (not shown). It will be noted that the driving shaft 10 is positioned at right angles to and in a horizontal plane above the horizontal plane of the driven shaft 11. Fixed to the driving shaft 10 is a driving element or wheel 14 and fixed to the driven shaft 11 is a driven element or wheel 15. The driving wheel 14 is provided with a number of driving studs 16 angularly positioned to perpendicularly project from its periphery and it may be preferable that the driving studs be rotatably journaled within the body of the driving wheel as shown in Figures 5 through 8 of the drawings. While it will be noted that, in the preferred embodiment, the driving studs 16 are provided with conical ends 17 to insure the smooth engagement of driving contact with the cam ridges 18 of the driven wheel 15, it should be understood that such conical ends are not essential.

Figure 4:
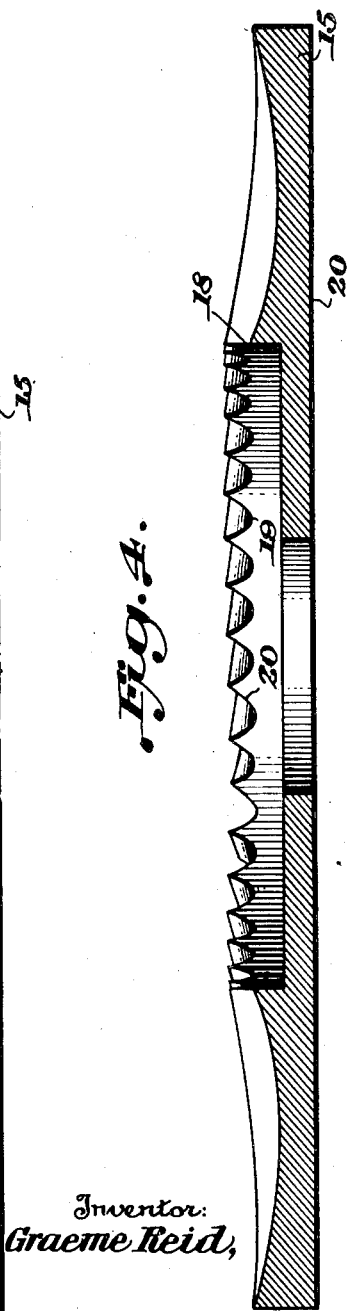
Figure 4 is a cross sectional view taken on line 4—4 of Figure 3 and showing the emergence and progressively increasing height of the cam groove ridges towards the center and above the base of the driven wheel.
Figure 12:
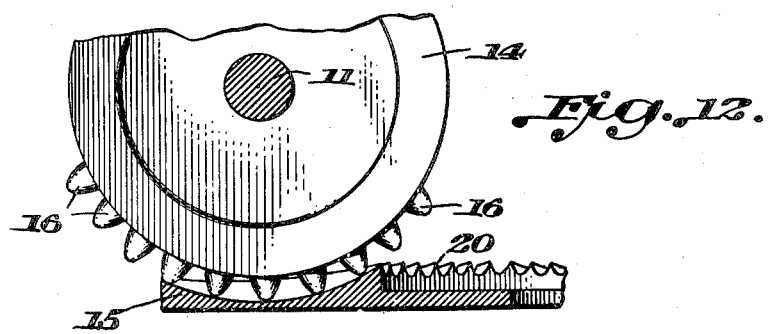
Figure 12 is a fragmentary elevational view of the driving wheel in driving engagement with the driven wheel which is shown in section to thus show the arc of contact for the driving studs on the driving wheel with the bottom of the cam grooves on the driven wheel.

The cam ridges 18 of the driven wheel 15 are shown in detail by Figures 3 and 4 of the drawings. The driven wheel is provided on its face with a series of cam ridges 18 radiating from the center of the wheel. It is preferable that the cam ridges spirally radiate towards the periphery of the wheel. The cam ridges increase in height towards the center of the wheel as shown by Figure 4 of the drawings while the surface of the bottom of the grooves 19 between the cam ridge 18 may, if desired, remain the same distance from the back face 20 of the driven wheel or conform to the arc prescribed by the rotation of the driving wheel 14 and studs 16 as shown in Figure 12 of the drawings. The desirability of increasing the height of the cam ridge 18 above the front face and towards the center of the driven wheel will be apparent from the description of the operation of my invention, which will be referred to hereinafter but it is not absolutely essential that the cam ridges have a varying height. It should also be noted that as the cam ridges 18 increase in height towards the center of the wheel 15, their width at their bases also increases until the width of the grooves 19 finally conforms to the design of the heads of the driving studs 16. As will be apparent by reference to Figure 4 of the drawings, the walls 20 of the cam ridge 18 are shaped to conform to the shape of the end 17 of the driving studs 16.

Means are provided for moving the shaft 10 axially within the bearings 12 and 13 either by manual control or by automatic control or both. The automatic control will be described further in connection with a preferred embodiment of the invention as adapted for automotive use. The manual control may include various forms of shifting linkage and rods (not shown) for moving the shifting yoke 25 in an axial direction of the shaft 10. The shaft 10 is provided with the collars 26, 27, and 28, while rotatably journaled on the shaft 10 between the collars 27 and 28 is the shifting member 29. Compression springs 30 and 31 are provided to absorb shocks and transmit the axial thrust to the collars 27 and 28 and the shaft 10 when the shifting member 29 is moved. A shoulder 32 on the shifting member 29 cooperates through suitable bearings and cushion springs with the manual shifting yoke 25 so that the shaft 10 and driving wheel 14 may be axially moved by the shifting linkage to any position within the limits defined by the collar 26 and the bearings 12 and 13.

Considering now the operation of my invention as thus far described in connection with the manual control of the transmission ratio; when the driving wheel 14 is rotated in the axial position of Figure 1, there will be no rotation imparted to the driven member 15 since the driving studs 16 are rotating in the plane defined by the dotted lines of Figure 3 of the drawings and are not contacting in driving relation, the side walls of the cam ridges 18 or may be contacting both side walls with equal force in opposite directions so that the driven member 15 is not rotated. As the driving wheel 14 is axially moved from the position shown in Figure 1, the driving studs 16 begin to engage the walls of the cam ridges 18 as they rotate and an angular thrust or rotation is imparted to the driven wheel. The transmission ratio for any axial position of the driving wheel other than the neutral position is a function of the proportional number of driving studs 16 to cam ridges 18 and the geometrical spiral shape of the cam ridges. With the proportions selected for illustration in the drawings, when the driving wheel is in the position shown by Figure 2, the transmission ratio is approximately one to one or a direct drive. In the direct drive position, as the driving wheel is rotated, each driving stud rotates into contact with a successive cam ridge, and maintains driving contact for a maximum length of time. Thus, during direct drive and with the proportions shown, there may be as many as four driving studs of the driving wheel maintained in driving contact or rotation with four cam ridges on the driven wheel at the same time. When the driving wheel is rotating at any axial position from that shown in Figure 1 of the drawing to that shown in Figure 2, the driven wheel will be imparted with a forward rotation. To obtain a reverse rotation of the driven wheel it is only necessary to move the driving wheel axially to the left of the position shown in Figure 1. It should be understood that with the manual control shifting elements previously described it is possible to continuously vary the transmission ratio during rotation of the driving wheel and that either forward or reverse rotation of the driven wheel may be obtained. Since the axial plane of the driving wheel is considerably above the axial plane of the driven wheel it is desirable to increase the height of the cam ridges 18 towards the center of the driven wheel 15 in order that the driving studs may be gradually brought into the position of maximum driving force to the driven element and thus insure smooth operation.

I have thus far described an operative embodiment of my invention that is adapted for manual control to obtain, if desired, a continuous variation in transmission ratio from the neutral position to either a forward or reverse direction. In order to reduce friction in the contact between the driving studs 16 and the cam ridges 18 it may be desirable to journal the studs in suitable bearings within the driving wheel 16. Referring to Figures 6 through 9 of the drawings, the driving stud 16 is provided with the tapered shank 35 adapted to be inserted and journaled within a suitably shaped recess 36 of the driving wheel 15. The recess 36 is so shaped as to permit the shank 35 of the stud to pivot at the point 37 and move in an axial direction of the driving wheel 15 to positions similar to that shown in Figures 8 and 9 of the drawings. The pivot point 37 is provided with a spring loaded thrust bearing comprised of the ball bearings 38, the bearing plate 39 and the spring 40 contained in the recess 41 of the driving wheel 15. It should be understood that the particular embodiments being described are considered as illustrative only and that detail changes in structure might be resorted to in order to facilitate manufacture and assembly. Ball bearing raceways 45 on the stud 16 cooperate with bearing balls 46 and the bearing ring 47 to permit free rotation of the stud. The bearing ring 47 is also provided with extensions 48 and 49 which are slidably journaled in the slideways 50 and 51 respectively. Compression springs 52 and 53 normally center the shank of the driving stud in the position shown in Figure 6 but are yieldable to permit movement of the stud in an axial direction of the driving wheel to absorb shocks due to sudden contacts and applications of power between the driving stud 16 and the cam ridge 18. Hence, when using the modifications described, an even flow of power may be obtained during the periods of continuous variation of transmission ratio and friction losses will be minimized since the driving studs will be permitted a rolling contact with the cam surfaces.

As previously mentioned, the power transmission of my invention is especially suitable for application to automotive use. The present trend of automotive transmission developments is towards the completely automatic transmission that automatically selects the proper transmission ratio for the most efficient transmission of power from the motor to the wheels at any desired wheel speed and torque. By providing an automatically controlled means for shifting the axial position of the driving wheel and hence changing the transmission ratio, the transmission of my invention becomes a completely automatic transmission. Any suitable automatic control means may be used in combination with my transmission but I have shown in connection with Figures 1, 2, 10 and 11, a centrifugal governor control means which may be advantageously combined with a manual shifting means to obtain an automatic control of the transmission ratio and which may at any time be manually modified. This is an important feature of my invention since the conventional automatic transmissions are particularly unwieldly in providing for a manual control or supervision of the automatic controlling means.

My transmission is characterized by the fact that the driving wheel, during its rotation, will normally be urged to move axially to the neutral position rather than drive the driven member unless the manual or automatic shifting mechanism is employed to maintain the driving wheel at an axial position for driving the driven wheel.

However, should the reaction torque of the normally driven element become greater than the driving torque of the normally driving element, the normally driven element will become the driving element and the normally driving element will become the driven element. To illustrate, it is apparent that, with the driven element rotating to the right, clockwise, and the driving element held against the collar 13, the driven element may and will, if its clockwise torque is greater than that being transmitted by the driving element, drive the driving element. The design of the curvature of the grooves, as approximately illustrated, is such that in this position, whether driving or driven, the lugs will have continuous contact with the groove walls throughout their passage from one end of the groove to the other at this point; also, each successive lug passes through each successive groove so that at all times four successive lugs are in contact with the walls of four successive grooves. The extent of this contact (assuming rigid lugs are used rather than laterally flexible lugs) is reduced as the driven element moves to the left toward the neutral position. However, so long as any angle exists between the pressing groove side and the vertical projectory of the lugs, the driven wheel may drive the driving wheel except that, as the neutral position is approached, the lugs must be driven through at a forever increasing rate. At the neutral position, as heretofore set forth, there may be no contact at all or, the line of the groove side being parallel to the projectory of the lugs, the driven element may press against but impart no motion to the driving element though the driving element may rotate at any rate of speed. Carrying the driven element further to the left it will finally reach a point of sufficient contact against the oppositely curved walls of the driven element grooves to rotate the driven element in a reverse direction. Similarly, at this point, or any point to the left of neutral, the driven element may drive the driving element just as in the case of forward motion when the driving element is moved to the right of the neutral position. Because of the outwardly curving walls, the reverse, or left of neutral, operation is not as smooth or efficient as in forward drive. The device as illustrated is designed for highly efficient and smooth forward operation to the slight detriment of the smooth operation in reverse. The speed of rotation of the automatically controlling means for shifting the normally driving element, coupled with the vanes of the normally driven element, will position the normally driving element into its lowest gear ratio with respect to the normally driven element. There will, obviously, be a braking action on the normally driven element through the drag of the source of power. This braking action may be augmented and increased by the manual control of the normally driving element. Thus, by manually urging the normally driving element, by means of the linkage (not shown) and the yoke 25, toward the neutral position, the gear ratio will be gradually increased thus effecting greater braking action through the source of power. Obviously, the higher the gear ratio is, the greater the braking effect on the normally driven element will be, and hence the vehicle will be retarded.

Figure 10:
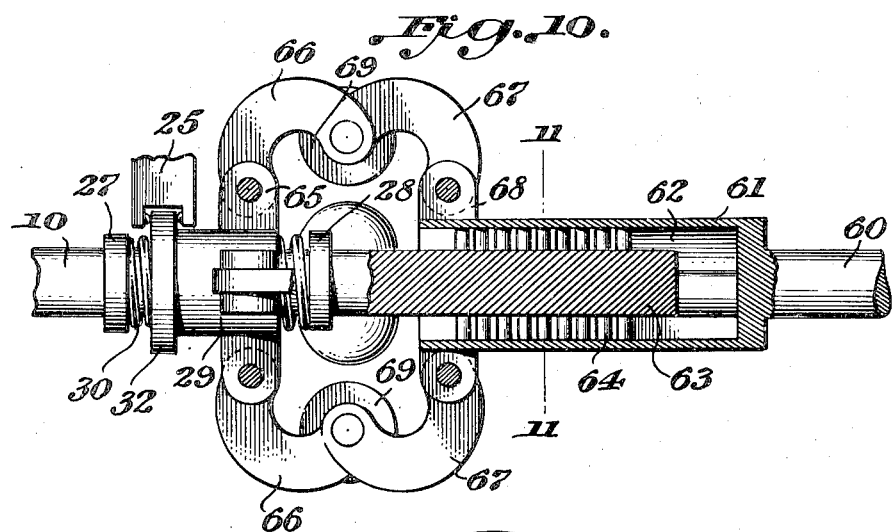
Figure 10 is an enlarged detail view partly in section of the centrifugal means for automatically varying the transmission ratio in accordance with the speed and power demands.
Figure 11:
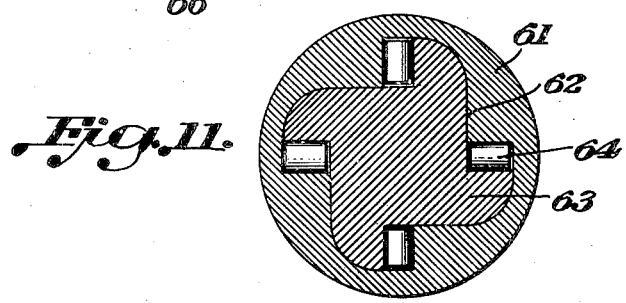
Figure 11 is a sectional view taken on line 11—11 of Figure 10.

Referring particularly to Figures 10 and 11 of the drawings, the details of the centrifugal governor control means will be described. The motor shaft 60 is provided with an enlarged end 61 having the spline socket 62. The driving shaft 10 is provided with the splined end 63 adapted to slidably extend into the spline socket 62 of the motor shaft 60. In order to reduce friction, bearing rolls 64 are employed although such an expedient is not necessary as ball bearings or other devices may be used. The shifting member 29 which is slidably positioned on the driving shaft 10 but connected by the compression springs 30 and 31 to transmit axial thrust to the shaft is provided with ear projections 65 to which are pivotally connected the governor arms 66. Governor arms 67 are pivotally connected to ear projections 68 of the motor shaft 60 and the outer ends of arms 66 and 67 are pivotally connected together. Weight members 69 are also attached to the pivot connection between the arms 66 and 67 so that an increased speed of rotation of the motor shaft will tend to throw the weights outward by centrifugal force and move the shifting member 29 axially to the position shown by Figure 2 of the drawings.

The operation of the centrifugal control for automatic adjustment of the transmission ratio should be readily apparent. Assuming that the transmission has been applied to automotive use, a change in power demand at the wheels will at first cause a reduction in speed of both the driven and driving wheels. This reduction in speed will permit the centrifugal weights to move inward and hence allow the driving wheel to move axially to the left towards the neutral position and providing a higher transmission ratio with the driving wheel rotating at proportional increased speed relative to the driven wheel. Hence the demand for increased power at the wheels of the automotive vehicles has been supplied by automatically adjusting the transmission ratio. Should the speed of the motor be increased, the reverse will hold true and the driving wheel will tend to be axially moved to a position of lower transmission ratio approaching a direct drive.

It is a further advantage of my invention that the automatic centrifugal control in combination with the continuously variable power transmission will avoid the necessity of a clutch or fluid drive when applying the transmission to automotive use. By suitably designing the centrifugal control mechanism it is possible to provide that the driving wheel will be in the axial position for neutral driving ratio when the motor shaft is revolved at a speed corresponding to the idling speed of the motor. Thereafter, an increase in motor speed will result in an axial movement of the driving wheel to a position for a driving ratio of power transmission.

It should be apparent that my invention is capable of various modifications and embodiments within the scope of the appended claims.

In the claims:

1. In combination, a driven wheel, a driving wheel with its axis disposed at right angles to and in a plane displaced from the plane of the axis of the driven wheel, said driven wheel having a plurality of cam ridges and grooves therebetween radially disposed on its surface adjacent to the periphery of the driving wheel, said driving wheel being provided with a plurality of driving studs angularly disposed about its periphery, said driving studs being adapted to move through the grooves of said driven wheel without contacting in driving relation the walls of said cam ridges upon rotation of the driving wheel, and means for axially moving said driving wheel whereupon said driving studs contact in driving relation the walls of said cam ridges of the driven wheel upon rotation of said driving wheel and impart a rotary motion to said driven wheel.

2. In combination, a driven wheel, a driving wheel with its axis disposed at right angles to and in a plane displaced from the plane of the axis of the driven wheel, said driven wheel having a plurality of spiral cam ridges and grooves therebetween radially disposed on its surface adjacent to the periphery of the driving wheel, said driving wheel being provided with a plurality of driving studs angularly disposed about its periphery, said driving studs being adapted to move through the grooves of said driven wheel without contacting in driving relation the walls of said cam ridges upon rotation of the driving wheel, and means for axially moving said driving wheel whereupon said driving studs contact in driving relation the walls of said cam ridges of the driven wheel upon rotation of said driving wheel and impart a rotary motion to said driven wheel.

3. In combination, a driven wheel, a driving wheel with its axis disposed at right angles to and in a plane displaced from the plane of the axis of the driven wheel, said driven wheel having a plurality of cam ridges and grooves therebetween radially disposed on its surface adjacent to the periphery of the driving wheel, said cam ridges having increased height above the surface of said driven wheel towards its center, said driving wheel being provided with a plurality of driving studs angularly disposed about its periphery, said driving studs being adapted to move through the grooves of said driven wheel without contacting in driving relation the walls of said cam ridges upon rotation of the driving wheel, and means for axially moving said driving wheel whereupon said driving studs contact in driving relation the walls of said cam ridges of the driven wheel upon rotation of said driving wheel and impart a rotary motion to said driven wheel.

4. In combination, a driven wheel, a driving wheel with its axis disposed at right angles to and in a plane displaced from the plane of the axis of the driven wheel, said driven wheel having a plurality of cam ridges and grooves therebetween radially disposed on its surface adjacent the periphery of the driving wheel, said driving wheel being provided with a plurality of driving studs angularly disposed about its periphery, said driving studs having conical ends adapted to move through the grooves of said driven wheel without contacting in driving relation the walls of said cam ridges upon rotation of the driving wheel, and means for axially moving said driving wheel whereupon said driving studs contact in driving relation the walls of said cam ridges of the driven wheel upon rotation of said driving wheel and impart a rotary motion to said driven wheel.

5. In combination, a driven wheel, a driving wheel with its axis disposed at right angles to and in a plane displaced from the plane of the axis of the driven wheel, said driven wheel having a plurality of cam ridges and grooves therebetween radially disposed on its surface adjacent the periphery of the driving wheel, said driving wheel being provided with a plurality of rotatably journaled driving studs angularly disposed about its periphery, said driving studs being adapted to move through the grooves of said driven wheel without contacting in driving relation the walls of said cam ridges upon rotation of the driving wheel, and means for axially moving said driving wheel whereupon said driving studs contact in driving relation the walls of said cam ridges of the driven wheel upon rotation of said driving wheel and impart a rotary motion to said driven wheel.

6. In combination, a driven wheel, a driving wheel with its axis disposed at right angles to and in a plane displaced from the plane of the axis of the driven wheel, said driven wheel having a plurality of cam ridges and grooves therebetween radially disposed on its surface adjacent to the periphery of the driving wheel, said driving wheel being provided with a plurality of rotatably journaled driving studs angularly disposed about its periphery, said driving studs having conical ends adapted to move through the grooves of said driven wheel without contacting in driving relation the walls of said cam ridges upon rotation of the driving wheel, and means for axially moving said driving wheel whereupon said driving studs contact in driving relation the walls of said cam ridges of the driven wheel upon rotation of said driving wheel and impart a rotary motion to said driven wheel.

7. In combination, a driven wheel, a driving wheel with its axis disposed at right angles to and in a plane displaced from the plane of the axis of the driven wheel, said driven wheel having a plurality of cam ridges and grooves therebetween radially disposed on its surface adjacent to the periphery of the driving wheel, the cam ridges being so disposed relative to each other that the width of the grooves therebetween are greatest at the periphery of the driven wheel, said driving wheel being provided with a plurality of driving studs angularly disposed about its periphery, said driving studs being adapted to move through the grooves of said driven wheel without contacting in driving relation the walls of said cam ridges upon rotation of the driving wheel, and means for axially moving said driving wheel whereupon said driving studs contact in driving relation the walls of said cam ridges of the driven wheel upon rotation of said driving wheel and impart a rotary motion to said driven wheel.

8. In combination, a driven wheel, a driving wheel with its axes disposed at right angles to and in a plane displaced from the plane of the axis of the driven wheel, said driven wheel having a plurality of spiral cam ridges and grooves therebetween radially disposed on its surface adjacent to the periphery of the driving wheel, the cam ridges being so disposed relative to each other that the width of the grooves therebetween are greatest at the periphery of said driven wheel, said driving wheel being provided with a plurality of driving studs angularly disposed about its periphery, said driving studs being adapted to move through the grooves of said driven wheel without contacting in driving relation the walls of said cam ridges upon rotation of the driving wheel, and means for axially moving said driving wheel whereupon said driving studs contact in driving relation the walls of said cam ridges of the driven wheel upon rotation of said driving wheel and impart a rotary motion to said driven wheel.

9. In combination, a driven wheel, a driving wheel with its axis disposed at right angles to and in a plane displaced from the plane of the axis of the driven wheel, said driven wheel having a plurality of spiral cam ridges and grooves therebetween radially disposed on its surface adjacent to the periphery of the driving wheel, said cam ridges having increased height above the surface of said driven wheel towards its center and being so disposed relative to each other that the width of the grooves therebetween are greatest at the periphery of said driven wheel, said driving wheel being provided with a plurality of driving studs angularly disposed about its periphery, said driving studs being adapted to move through the grooves of said driven wheel without contacting in driving relation the walls of said cam ridges upon rotation of the driving wheel, and means for axially moving said driving wheel whereupon said driving studs contact in driving relation the walls of said cam ridges of the driven wheel upon rotation of said driving wheel and impart a rotary motion to said driven wheel.

10. In combination, a driven wheel, a driving wheel with its axis disposed at right angles to and in a plane displaced from the plane of the axis of the driven wheel, said driven wheel having a plurality of cam ridges and grooves therebetween radially disposed on its surface adjacent to the periphery of the driving wheel, said driving wheel being provided with a plurality of driving studs angularly disposed about its periphery and resiliently mounted for limited movement axially of the driving wheel, said driving studs being adapted to move through the grooves of said driven wheel without contacting in driving relation the walls of said cam ridges upon rotation of the driving wheel, and means for axially moving said driving wheel whereupon said driving studs contact in driving relation the walls of said cam ridges of the driven wheel upon rotation of said driving wheel and impart a rotary motion to said driven wheel.

11. In combination, a driven wheel, a driving wheel with its axis disposed at right angles to and in a plane displaced from the plane of the axis of the driven wheel, said driven wheel having a plurality of cam ridges and grooves therebetween radially disposed on its surface adjacent to the periphery of the driving wheel, said driving wheel being provided with a plurality of rotatably journaled driving studs angularly disposed about its periphery and resiliently mounted for limited movement axially of the driving wheel, said driving studs being adapted to move through the grooves of said driven wheel without contacting in driving relation the walls of said cam ridges upon rotation of the driving wheel, and means for axially moving said driving wheel whereupon said driving studs contact in driving relation the walls of said cam ridges of the driven wheel upon rotation of said driving wheel and impart a rotary motion to said driven wheel.

12. In combination, a driven wheel, a driving wheel with its axis disposed at right angles to and in a plane displaced from the plane of the axis of the driven wheel, said driven wheel having a plurality of cam ridges and grooves therebetween radially disposed on its surface adjacent to the periphery of the driving wheel, said driving wheel being provided with a plurality of rotatably journaled driving studs angularly disposed about its periphery and resiliently mounted for limited movement axially of the driving wheel, said driving studs having conical ends being adapted to move through the grooves of said driven wheel without contacting in driving relation the walls of said cam ridges upon rotation of the driving wheel, and means for axially moving said driving wheel whereupon said driving studs contact in driving relation the walls of said cam ridges of the driven wheel upon rotation of said driving wheel and impart a rotary motion to said driven wheel.

13. In combination, a driven wheel, a driving wheel with its axis disposed at right angles to and in a plane displaced from the plane of the axis of the driven wheel, said driven wheel having a plurality of cam ridges and grooves therebetween radially disposed on its surface adjacent to the periphery of the driving wheel, said driving wheel being provided with a plurality of driving studs, angularly disposed about its periphery, said driving studs being adapted to move through the grooves of said driven wheel without contacting in driving relation the walls of said cam ridges upon rotation of the driving wheel, and manual means for axially moving said driving wheel whereupon said driving studs contact in driving relation the walls of said cam ridges of the driven wheel upon rotation of said driving wheel and impart a rotary motion to said driven wheel.

14. The combination recited in claim 1 wherein the means for axially moving said driving wheel includes both manual means and means automatically responsive in accordance with the rotating speed of said driving wheel.

15. The combination recited in claim 1 wherein the means for axially moving said driving wheel includes both manual means and centrifugal means automatically responsive in accordance with the rotating speed of said driving wheel.

16. The combination recited in claim 9 wherein the means for axially moving said driving wheel includes both manual means and means automatically responsive in accordance with the rotating speed of said driving wheel.

17. The combination recited in claim 12 wherein the means for axially moving said driving wheel includes both manual means and means automatically responsive in accordance with the rotating speed of said driving wheel.

18. In combination, a driven wheel, a driving wheel with its axis disposed at right angles to and in a horizontal plane displaced from the horizontal plane of the axis of the driven wheel, said driven wheel having a plurality of cam ridges and grooves therebetween radially disposed on its surface adjacent to the periphery of the driving wheel, said driving wheel being provided with a plurality of driving studs angularly disposed about its periphery, said driving studs being adapted to move through the grooves of said driven wheel without contacting in driving relation the walls of said cam ridges upon rotation of the driving wheel, and means for axially moving said driving wheel whereupon said driving studs contact in driving relation the walls of said cam ridges of the driven wheel upon rotation of said driving wheel and impart a rotary motion to said driven wheel.

GRAEME REID.

REFERENCES CITED

The following references are of record in the file of this patent:

UNITED STATES PATENTS

| Number | Name | Date |
|---|---|---|
| 870,715 | Cowles | Nov. 12, 1907 |
| 955,279 | Moore | Apr. 19, 1910 |
| 1,006,957 | Lapointe | Oct. 24, 1911 |
| 1,251,784 | Joslin | Jan. 1, 1918 |